United States Patent [19]

Roberts et al.

[11] 3,907,674

[45] Sept. 23, 1975

[54] FLUID BED INCINERATION OF WASTES CONTAINING ALKALI METAL CHLORIDES

[75] Inventors: Elliott J. Roberts, Westport; Peter Allen Angevine, Ridgefield, both of Conn.

[73] Assignee: Dorr-Oliver Incorporated, Stamford, Conn.

[22] Filed: Apr. 24, 1974

[21] Appl. No.: 463,655

[52] U.S. Cl. .................... 210/20; 210/63; 210/152; 110/28 J; 110/8 F; 423/659.5 F; 432/15
[51] Int. Cl.² ..................... C02B 1/34; F23D 19/00
[58] Field of Search ........... 210/63, 67, 71, 152, 68, 210/20; 432/15, 28, 2; 423/481, 482, 552, 334, 332, 331, 328, 327, 659.5 F; 110/28 J, 8 F

[56] References Cited
UNITED STATES PATENTS

| | | | |
|---|---|---|---|
| 2,944,807 | 7/1960 | Kruijer | 432/15 |
| 3,466,021 | 9/1969 | Van Weert et al. | 432/15 |
| 3,481,702 | 12/1969 | Moore et al. | 423/481 |
| 3,717,700 | 2/1973 | Robison et al. | 110/28 J |
| 3,752,883 | 8/1973 | Moore, Jr. | 423/481 |

*Primary Examiner*—Thomas G. Wyse
*Assistant Examiner*—Benoit Castel
*Attorney, Agent, or Firm*—H. M. Snyder; Burtsell J. Kearns; Theodore M. Jablon

[57] ABSTRACT

Combustible waste materials containing alkali metal chlorides and sulfur and/or sulfates are incinerated in a fluid bed reactor by a process in which formation of low melting eutectics is avoided. The temperature of the fluid bed is maintained substantially above the vapor saturation temperatures of the alkali metal chlorides so that they are to a great extent carried out with the combustion gases. By insuring the presence of sufficient reactive silica and a sufficiently high temperature, alkali metal sulfates can be prevented from accumulating. Any sticky alkali metal silicate glasses which tend to form are prevented from causing defluidization by insuring the presence of sufficient CaO, MgO, $Fe_2O_3$ and/or $Al_2O_3$ so that the glass is converted into high melting silicate compounds.

13 Claims, 1 Drawing Figure

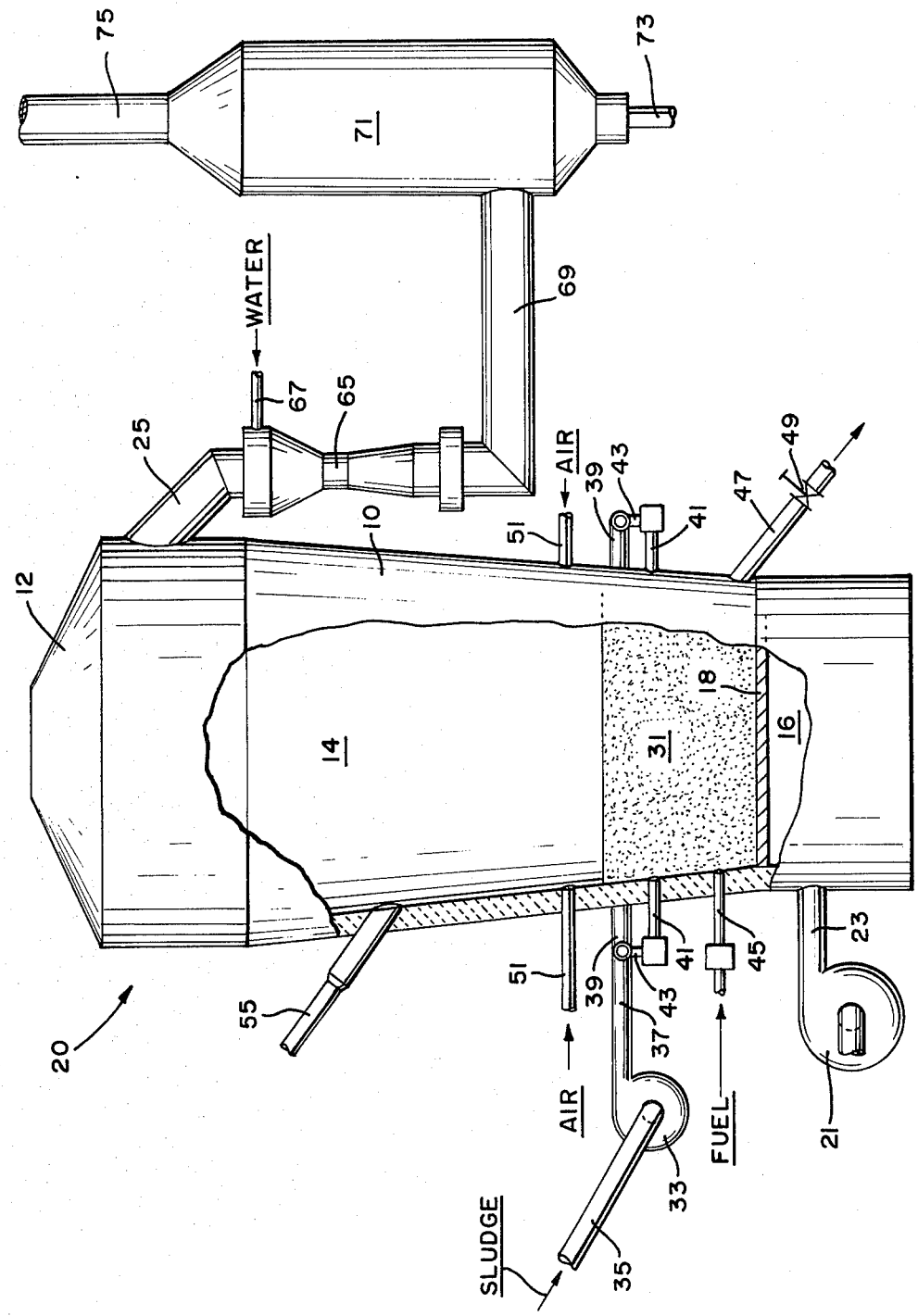

3,907,674

FLUID BED INCINERATION OF WASTES CONTAINING ALKALI METAL CHLORIDES

This invention is directed to the incineration in a fluid bed reactor of combustible waste streams or sludges which have a high chloride content.

Fluid bed reactors have been successfully applied to the incineration of combustible waste streams such as sewage sludge and oil refinery wastes. In these reactors a bed of inert particles, sand, for example, is supported on a gas distribution or constriction plate. Air or another gas is passed through the constriction plate to "fluidize" the inert particles. Initially, after raising the bed temperature to a suitable level, fuel is injected into the bed and ignited to raise the bed to operating temperature and then the combustible waste is introduced. The waste undergoes combustion, generating a substantial amount of heat which makes it possible to reduce the amount of fuel introduced and, in some cases, may eliminate the necessity for the auxiliary fuel.

The purpose of the fluid bed incinerators is to completely consume the organic matter in the waste feed stream, leaving as a residue only an inert ash, and to perform this combustion reaction in a manner which does not produce objectionable odors. Odorless combustion is achieved by complete oxidation of the organic matter and requires, as a practical matter, temperatures at least in the range from about 700°C to about 800°C depending on the percent excess air.

In operating certain fluid bed installations, it has been found that the organic waste streams are contaminated with chlorides. This is particularly prevalent in installations associated with population centers and refineries at coastal locations. The ground water near the seacoast is often briny and inevitably intrudes into the waste lines. The salts in sea water comprise from about 75 – 85% NaCl, small amounts of $CaSO_4$, $MgCl_2$ and $MgSO_4$ and lesser amounts of other salts. Certain industrial wastes contain chlorides which are present as the natural consequence of reactions used to produce commercial products. Tanker ballast water is another waste material containing both organics and chlorides. Such chloride-contaminated waste streams or sludges are difficult to incinerate because chlorides in general, e.g., the alkali metal chlorides, have low melting points and give rise to formation of low-melting eutectics at the required combustion temperatures, which causes the ash to become sticky and, when this occurs in fluid bed units, the bed defluidizes.

In this discussion, it will be understood that the reference to "alkali metal" refers primarily to the elements sodium and potassium, which are commonly found in the waste feed material with which this invention is concerned.

Sodium and potassium chlorides have appreciable vapor pressures at temperatures above 800°C and can therefore be volatilized by raising the temperature of the incinerator suitably above the "dew" point or saturation temperature of the chlorides, which, of course, will be a function of the concentration of the chlorides in the waste stream. The chlorides in the off-gases are then treated in a scrubber and, as a result, are dissolved in the scrubber water and can then be separately disposed of. Since this is a relatively simple method of removing and disposing of the chlorides, it would be highly desirable if such a method could be employed. However, unless precautions are taken, relatively nonvolatile alkali metal sulfates, i.e., $Na_2SO_4$ and $K_2SO_4$, accumulate in the bed and eventually cause defluidization, because they, or mixtures of these compounds with NaCl, have melting points falling in the temperature range required for volatilization (885°C is the melting point for pure $Na_2SO_4$). Sulfur occurs naturally in sea water, as indicated above, in some waste streams and in oil which may be used as an auxiliary fuel.

It has been proposed (U.S. application Ser. No. 368,535, filed June 11, 1973 in the name of Elliott J. Roberts, now U.S. Pat. No. 3,864,458) to convert all of the alkali metals to sulfates, driving off the chlorine as HCl and operating well below the volatilization temperatures of the alkali metal chlorides, for example, in the temperature range from 620°C to 787°C. In some cases, however, the presence of certain other elements such as magnesium in the waste stream leads to low-melting eutectics which would cause defluidization.

Accordingly, there is a real need for a fluid bed process for the incineration of chloride-containing organic waste streams which will be more widely applicable than those presently available.

It is an object of this invention, in the process of fluid bed incineration of chloride-containing combustible waste streams and volatilization of alkali metal chlorides, to prevent formation of deleterious amounts of low-melting eutectics in the bed and thus maintain fluidization of the bed.

It is a further object of the invention, in a fluid bed process for the incineration of chloride-containing waste feeds, to achieve volatilization of chloride compounds while preventing the accumulation of alkali metal sulfates in the bed and avoiding the formation of sticky sodium and potassium silicate glasses in the bed.

Other objects and advantages will become apparent to those skilled in the art from the following description, taken in conjunction with the drawing, in which:

The FIGURE is a view in elevation and in part in section of a fluid bed incinerator in which the process of the invention may be practiced.

Generally speaking, the present invention involves the introduction into a fluid bed reactor, operating on a combustible aqueous waste stream or sludge containing alkali metal chlorides at an elevated temperature and in the presence of sulfur-containing compounds, of a source of silicon dioxide and a metal oxide to react with alkali metal-containing compounds present in the reactor to prevent formation of sticky alkali metal silicate glasses or, if such glasses are formed, to convert them to high-melting crystalline silicate compounds.

More specifically, $SiO_2$ and at least one metal oxide from the group consisting of CaO, MgO, $Al_2O_3$ and $Fe_2O_3$ may be added directly to a chloride-containing waste stream prior to introduction into the fluidized bed; or alternatively, the silica and metal oxide may be separately injected into the bed. As an example, pulverized sand and slaked lime, $Ca(OH)_2$, may be employed. Instead of lime, or in substitution for a part of the lime, one or more of the metal oxides MgO, $Al_2O_3$ or $Fe_2O_3$ may be used as devitrifiers either to prevent formation of sticky silicates or to react with such silicates to form high melting non-sticky silicates. Various sources of these oxides may be used as long as they are in a suitable state of subdivision. In some cases it may be possible to choose the method of concentrating the waste so as to use substances which will later be useful in the incineration operation. For example, a diatomaceous filter aid could be used for a filtration step which would later serve as a source of at least a part of the silica in the incineration step. Likewise, an alum floc (Al(OH)$_3$) could be used to collect oil droplets and this would serve as a source of at least a part of the Al$_2$O$_3$ needed to protect the bed against defluidization.

The addition of kaolin or clay is a somewhat special case of the present invention. Clays are hydrous aluminum silicates with SiO$_2$/Al$_2$O$_3$ mole ratios generally in the 2 to 3 range and, obviously, are a convenient source of both silica and alumina in an extremely fine state of subdivision, the average particle size being of the order of one micron. The mechanism of the clay addition is not entirely understood, but there is strong evidence indicating that the clay reacts "in flight" directly with the alkali metal chloride to form crystalline sodium aluminum silicates which do not melt at the operating temperature of the reactor. The deleterious alkali metal sulfate is thus not formed to any substantial extent and the sulfur is removed from the reactor with the exhaust gases almost certainly either as SO$_2$ gas or as fine dust particles of CaSO$_4$. A possible source of clay solids for the application might be spent bleaching clays from refinery operations.

Considering the process as a whole, it should be understood that a large proportion of the alkali metal chloride that is present in the incoming feed will be volatilized by the high temperature in the reactor and will leave the reactor as components of the exhaust gases. This invention is particularly concerned with that part of the alkali metal chlorides which, rather than leaving the reactor promptly in a gaseous phase, tends to react with the alkali metal present in the reactor to form deleterious products. It is found that some of the alkali metal in the incoming feed tends to react with sulfur-containing compounds to form undesirable alkali metal sulfates in the bed.

In the following discussion Na is used as representing alkali metals, but is must be understood that similar reactions occur with potassium and that wherever Na is mentioned, sodium plus the sodium equivalent of the potassium is implied.

In carrying out one aspect of the process of the invention, it is first necessary to assure that sufficient SiO$_2$ in a reactive form is provided to the bed to prevent Na$_2$SO$_4$ from building up on the bed. This may depend somewhat on the concentration of sulfate in the feed and sulfur in the organic substances. Mechanisms for the formation of Na$_2$SO$_4$ are:

$$CaSO_4 + 2\ NaCl + H_2O \rightarrow Na_2SO_4 + 2\ HCl$$

or $$S + 1.5\ O_2 + H_2O + 2\ NaCl \rightarrow Na_2SO_4 + 2\ HCl$$

The Na$_2$SO$_4$ formed then reacts with SiO$_2$ as follows:

$$Na_2SO_4 + 3\ SiO_2 \rightarrow Na_2O \cdot 3SiO_2 + SO_2 + \tfrac{1}{2}\ O_2$$

In general, 0.5% to 3% by weight of SiO$_2$ will be sufficient based on the water content of the waste. In situations where the chloride content of the incoming feed is quite low, amounts of SiO$_2$ even less than 0.5% may be effective. The Na$_2$O·3SiO$_2$ glass formed as indicated above and other sodium silicate compounds formed subsequently are termed "water insoluble" for the purposes of this disclosure since they do not dissolve appreciably in the cold water leach analytical procedure used. The Na$_2$SO$_4$ and NaCl present, if any, dissolve readily in cold water and may be determined in the filtrate from the insoluble residue. Analysis of the latter for total sodium then gives a measure of the water insoluble sodium in the bed.

Secondly, at least from 1 to 3 moles metal oxide is added to obtain the following ratios based on the total rate of addition of water-insoluble sodium to the bed:

For Al$_2$O$_3$, one mole Al$_2$O$_3$ per two moles Na = 2.22 weight ratio of Al$_2$O$_3$/Na corresponding to Na$_2$O·Al$_2$O$_3$·6SiO$_2$ (albite) or Na$_2$O·Al$_2$O$_3$·2SiO$_2$ (nepheline).

For Fe$_2$O$_3$, one mole Fe$_2$O$_3$ per two moles Na = 3.48 weight ratio of Fe$_2$O$_3$/Na corresponding to Na$_2$O·Fe$_2$O$_3$·4SiO$_2$ (acmite).

For CaO, three moles CaO per two moles Na = 3.65 weight ratio of CaO/Na corresponding to Na$_2$O·3CaO·6SiO$_2$ (devitrite), although two moles may be sufficient in certain cases giving a weight ratio of 2.43 of CaO/Na corresponding to Na$_2$O·2CaO·3SiO$_2$.

For MgO, two moles per two moles Na = 1.74 weight ratio of MgO/Na corresponding to Na$_2$O·2MgO·6SiO$_2$.

Since some metal oxide may not participate in reactions in the bed due to particle size or carry-over (removal as dust), it may be necessary to add more than these amounts to insure that the amounts of these oxides retained by the bed for reaction bear the above ratios to the insoluble Na added to the bed. Also, the above ratios may not hold when mixtures are present. For example, in one test wherein the liquid feed being incinerated contained appreciable amounts of Ca and Mg, the Al$_2$O$_3$/Na ratio on the bed was 3.7 instead of 2.2. This was because some of the Al$_2$O$_3$ was tied up with CaO as CaO·Al$_2$O$_3$·2SiO$_2$ (anorthite) and some was tied up as MgO·Al$_2$O$_3$ (spinel).

Some insoluble Na may be fixed by direct reaction between the incoming NaCl and the additives:

$$3\ SiO_2 + 2\ NaCl + H_2O \rightarrow Na_2O \cdot 3SiO_2 + 2\ HCl$$

Thus, more Na may be insolubilized than corresponds to the SO$_4$ present in the feed. The 3 SiO$_2$ set forth in the above equation is approximate because the reaction tends to produce a glass, the silica content of which may vary. More SiO$_2$ than this may be required per mole of Na$_2$O because the compounds formed with CaO, MgO, Al$_2$O$_3$, and Fe$_2$O$_3$, e.g., Na$_2$O·3CaO·6SiO$_2$, may carry more SiO$_2$ than three moles per mole Na$_2$O. Some SiO$_2$ may come from the starting bed of sand which is usually used. However, when a full chemical bed is established, that is, when all of the original sand has either been displaced from the bed or is coated with other compounds so that the SiO$_2$ does not react with other bed constituents, all the required SiO$_2$ must somehow be furnished. It does no harm to allow some Na$_2$SO$_4$, say up to 2%, by weight, to accumulate on the bed temporarily if too little SiO$_2$ is furnished, but then more SiO$_2$ should be fed to break this up or at least stop the build-up because too much Na$_2$SO$_4$ (which will carry perhaps up to 25%, by weight, of NaCl with it) will cause defluidization. Even though the temperature of the reactor gases is above the dew point of NaCl, the Na$_2$SO$_4$ in the bed contains NaCl because the Na$_2$SO$_4$ reduces the vapor pressure of the NaCl in the molten mixture.

The operating temperature required is generally in the 850°C –950°C range depending on the concentration of sodium chloride present and the reactivity of the oxides added, but could be as low as 800° or as high as 1,000°C or slightly more.

Turning now to the addition of clay, it is believed that initially, with a fresh sand bed, the incoming NaCl reacts with the sand and water vapor (as described above) to produce a sticky glass (Na$_2$O·3SiO$_2$) to which clay particles adhere. A reaction then occurs between the clay particles, the glass and sand as follows:

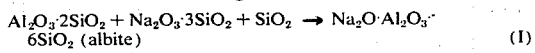

(I)

Also, it is also found that "in flight" absorption of sodium can take place without any contact with the sand bed itself:

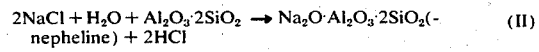

(II)

The albite or albite plus nepheline, which are high-melting crystalline compounds, coat the sand particles of the bed to a thickness of a few microns, which effectively seals off and renders the $SiO_2$ bed particles essentially inert after a relatively short period of operation. The reaction then proceeds in accordance with equation (II) above, the nepheline produced being in the form of dust which reports to the scrubber. As mentioned above, the sulfur present in the reactor is removed either as $SO_2$ gas or as fine $CaSO_4$ dust.

Normally the clay or other additive is mixed with the waste before injecting into the reactor. This insures that maximum utilization of the additive.

Referring now to the FIGURE, the reactor 20 comprises an outer shell 10 which is capped by a cover 12. Within the shell 10 the reaction chamber 14 is separated from the windbox 16 by the constriction plate 18. A pump 21 supplies fluidizing gas to the windbox 16 through conduit 23. A short down-coming exhaust conduit 25 conducts the exhaust gases to the venturi scrubber 65.

In the reactor 20, a bed 31 of finely divided solids is supported on the substantially horizontal constriction plate 18. The reactor illustrated in the FIGURE is arranged for the introduction of a pumpable feed such as partially dewatered activated sewage sludge or refinery wastes. The pump 33 forces the waste feed from conduit 35 into conduit 37 which is connected to the annular distribution pipe 39 which surrounds the reactor shell 10. A plurality of feed guns 41 are positioned about the periphery of the reactor 20 and penetrate shell 10 for direct injection of the waste feed into the fluidized bed 31. Alternatively, feed guns 41 can be located just above the upper surface of the expanded fluidized bed so that the waste feed drops onto the top surface of the fluidized bed. Each feed gun 41 is connected to the annular distribution pipe 39 by a feed tube 43 through which it is supplied with waste feed. Also provided are a number of fuel guns 45 which are positioned about the periphery of the reactor shell 10 for direct injection of auxiliary fuel into the fluidized bed. A discharge pipe 47 is provided to permit withdrawal of excess bed material. The constriction plate 18 comprises a flat steel plate containing numerous orifices, perforations or apertures (not shown) to allow the fluidizing gas access to the reaction chamber 14. At a level just above the top of the expanded fluidized bed 31, a plurality of air injection tubes 51 penetrate the reactor shell 10 for the purpose of injecting secondary air into a zone close above the bed. These air injection tubes 51 are supplied with pressurized air from a bustle pipe (not shown) surrounding the reactor shell 10. An inlet 55 is provided for introducing additional sand into the bed as required.

The exhaust gases, as mentioned above, leave the reactor chamber 14 through the exhaust conduit 25 which may be provided with a clean-out port (not shown). The exhaust conduit is as short as possible because the gas is cooling rapidly and condensation of at least some vaporized constituents can be anticipated. The longer the exhaust conduit, the heavier the deposit is likely to be and accumulations of such deposits must, sooner or later, be removed, with consequent downtime. The gases flow into the venturi scrubber 65 and there contact scrubber water provided through conduit 67. Dust particles in the gases are picked up by the water, while the soluble chloride compounds become dissolved in the water. The gases and liquid from the venturi scrubber 65 next flow through conduit 69 to the liquid-gas separator 71 in which the liquid flows to the bottom of separator 71, exiting through the conduit 73 for disposal and the gas leaves through the stack 75.

The waste feeds on which the process of the invention operates may contain up to 19,000 ppm of chloride (full strength sea water) or more although this may require temperatures above 1,000°C. It should be understood that the $Fe_2O_3$ addition should not be used for feeds containing much in excess of 5,000 ppm of chloride. This limit comes about through the observation that at 10,000 ppm of chloride, a temperature of about 950°C is required for volatilization of the chloride, while a eutectic between $SiO_2$, $Fe_2O_3$ and acmite ($Na_2O \cdot Fe_2O_3 \cdot 4SiO_2$) forms at about 955°C. Prudence dictates that a wide berth be given to this temperature in actual operation and this is best accomplished by not attempting to push the $Fe_2O_3$ addition into the treatment of feeds containing chlorides at the high end of the scale.

While certain of the metal oxides may be employed together, it is rather pointless to make additions of $Al_2O_3$ and $CaO$ together because they tend to react with each other forming $CaO \cdot Al_2O_3 \cdot 2SiO_2$ in preference to the desired reaction, and losses of the additives are sustained in this fashion.

For the purpose of giving those skilled in the art a better understanding of the invention, the following Examples are offered:

EXAMPLES

Tests are carried out on simulated organic waste streams containing a salt solution approximating sea water in the proportions of the ions, but containing roughly one-quarter or one-half of the normal content of salts in full strength sea water. Propane is employed in these tests as a substitute for the organic component of the waste stream and as the auxiliary fuel. The tests are performed in a fluid bed reactor of one foot internal diameter, the walls of which are externally heated to simulate the heat loss from a large unit. The salt solution with and without additives is introduced on top of the fluidized bed.

The fluid bed in all cases is silica sand ranging in size from 48 mesh (0.2 mm) up to 6 mesh (3.3 mm). This size range is chosen because the space rate used is about 3 ft. per second at the bottom of the bed and 5 ft./second at the top (due to the evaporated water). Fluidizing air is supplied at the rate of 38 SCFM and propane at the rate of 1.23 SCFM. The aqueous feed rate is approximately 0.8 lb./min.

In an initial test, no devitrifier is added to the fluid bed reactor. Finely ground quartz (−325 mesh) is added to the 5,000 ppm chloride simulated sea water feed to bring the $SiO_2$ concentration to 1.25%. The bed is operated at 900°C and defluidizes after 1.5 hours of operation. Analysis of the bed material after the test shows only 13 ppm of water-soluble sodium, but 520 ppm of water-insoluble sodium, whereas the starting sand carried only 194 ppm Na. Thus, the bed has picked up 326 ppm Na, enough to form about 0.3% glassy phase and this is sufficient to defluidize the bed.

Another test at 788°C with no added fine silica defluidizes in about 2 hours.

EXAMPLE 1

CaO as the Devitrifier

Operating at 900°C, a 5,000 ppm chloride solution containing 0.5% $Ca(OH)_2$ and 0.6% fine silica shows no build-up of soluble sodium on the bed after 24 hours. The original sand bed had been conditioned for 4 hours with 1% $Ca(OH)_2$ in the salt solution before the 24-hour test, and there was no soluble sodium accumulation, the $SiO_2$ of the sand bed evidently providing sufficient $SiO_2$ to break up the $Na_2SO_4$ formed during the conditioning period.

At the end of 4 hours, insoluble sodium is 0.12%, and at the end of 28 hours, it is 0.69%. However, there is also insoluble Ca on the bed to the extent of 0.22% and 1.3% respectively in the two samples, giving Ca/Na ratios of 1.83 and 1.88. These correspond to mole ratios of CaO to $Na_2O$ of 2.11 and 2.16.

The run is continued for another 24 hours at 875°C with the same 5,000 ppm Cl and 0.5% $Ca(OH)_2$ and 0.6% $SiO_2$ and then another 24 hours with 0.75% $Ca(OH)_2$ and 0.9% $SiO_2$. Soluble Na builds up on the bed steadily during this period, reaching 2,670 ppm Na, 358 ppm Cl and 5,016 ppm $SO_4$ at the end of the 48 hours. Thus, 0.8% $Na_2SO_4$ + NaCl is present as a molten salt mixture. Under these conditions, the bed had not defluidized, but it is clear that defluidization is inevitable with the continuing increase in soluble sodium.

Apparently the $Na_2SO_4$ which forms is decomposed at 900°C by the added silica or the sand bed but not at 875°C. The insoluble Na built up continually during the last 48 hours although at a decreasing rate, but Ca built up also, the final weight ratio of Ca/Na being 2.08.

This test shows that 875°C is an operating temperature too low for this combination of feed and additives, while 900°C is sufficient to enable $SiO_2$ to break up $Na_2SO_4$ with a 5,000 ppm chloride feed solution. It also shows that a Ca/Na mole ratio of just over 2 to 1 is satisfactory to prevent a sticky phase from forming at the test temperatures.

EXAMPLE 2

$Fe_2O_3$ as the Devitrifier

A sand bed which had been used in another test feeding 5,000 ppm chloride solution with 1.25% $SiO_2$ and 1.25% $Fe_2O_3$, first at 850°C for 52 hours, and then at 900°C for 52 hours, was operated at 900°C with this same mixture for another 28 hours. Soluble Na decreased from 600 ppm to 250 ppm during this period. Insoluble Na was 0.8% and $Fe_2O_3$ was 4.7%.

In the next test period, the salt solution was fed without $SiO_2$ or $Fe_2O_3$. After 24 hours the soluble Na had built up to 0.16%, so 0.6% $SiO_2$ was added to the feed stream. This slowed up the rate of soluble Na buildup markedly, but after an additional 10 hours the bed defluidized. Insoluble Na at the start of the 10-hour period was 1.18%, and 1.48% at the end. The Fe was 3.26% at the start and 3.46% at the end, giving Fe/Na weight ratios of 2.76 and 2.34. The Fe/Na weight ratio for $Na_2O \cdot Fe_2O_3 \cdot 4SiO_2$ (acmite) is 2.43, so apparently the bed defluidized as soon as the Fe dropped below this point and allowed some glassy phase sodium silicate to form.

Two conclusions are drawn from this test: first, that $SiO_2$ is necessary to prevent build-up of water soluble Na salts; and secondly, that enough iron oxide must be added to maintain a ratio of Fe to insoluble Na high enough (2.43 or more) to tie up all of the Na as acmite.

EXAMPLE 3

$Al_2O_3$ as the Devitrifier

Operating at 900°C with a 5,000 ppm chloride solution containing 1.5% kaolin, no build-up of soluble salts is observed in 21 hours and the bed remains fluidized for the whole period. The $Al_2O_3$/Na weight ratio on the bed at the end of this period is 5.6, corresponding to just over 2 moles of $Al_2O_3$ per mole of $Na_2O$.

The temperature is raised to 950°C, the concentration of salts is increased to 10,000 ppm, the amount of kaolin addition is doubled (3%) and the test continues for 6 more days with no defluidization or build-up of soluble salts ($Na_2SO_4$ plus NaCl). Insoluble sodium capture in the bed is remarkably low, chlorine ion is less than 10 ppm and, as to $S^{+6}$, only trace amounts were detected. Bed composition is very stable after the first day or so of operation, with only small amounts of alumina and sodium being present in the bed, and the $Al_2O_3$/Na ratio is 3.7.

EXAMPLE 4

MgO + CaO as the Devitrifier

In another series, the test is started at 850°C with no $SiO_2$ (except the sand bed) and 2% of $Ca(OH)_2$ + $Mg(OH)_2$ (slaked dolomitic lime) added to the 5,000 ppm Cl solution. Soluble Na accumulates rapidly and after 30 hours 1.25% fine $SiO_2$ is also added. Soluble Na still increases rapidly so at the end of another 26 hours the temperature is raised to 900°C. At the end of another 44 hours the bed is still fluid and the soluble Na has decreased appreciably, although not entirely eliminated.

The Ca and Mg contents of the bed at the end of the test are about 5% and 2% respectively, with only 0.17% insoluble Na, a clear indication that far more CaO + MgO had been added than was necessary. This is born out by the fact that a heavy scale deposit had accumulated on the reactor at the end of the 100-hour test.

The above examples clearly indicate that fluid bed incineration of waste streams or sludges contaminated with alkali metal chlorides is entirely feasible under conditions in which alkali metal chlorides are volatilized. The additives required for the process are generally available in inexpensive forms, particularly sand and clay. Since waste feed streams of different origins will vary widely in composition, the amount of additives introduced in a particular case will depend upon that composition. For example, waste streams often contain small amounts of sand and one more metal oxides. Once the typical composition of the waste stream has been analyzed, the proper amount of additives can be calculated in accordance with this invention. Some adjustment of the addition may be necessary from time to time to accommodate variations in feed stream composition.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for fluid bed incineration, in the presence of sulfur or sulfur-containing compounds, of an aqueous combustible organic waste stream contaminated with at least one alkali metal chloride, comprising the steps of:
   1. fluidizing a body of particulate material in a reaction chamber by passing an upwardly flowing stream of air therethrough,
   2. maintaining the fluidized body at a temperature in the range from about 800°C up to about 1,000°C to burn the organic material and volatilize a substantial portion of the alkali metal chloride, the unvolatilized alkali metal remaining in the bed being expressed in terms of water-soluble and water-insoluble Na,
   3. introducing finely divided $SiO_2$ in an effective amount of up to 3%, by weight, based on the water content of said combustible waste, and at least one metal oxide selected from the group consisting of CaO, MgO, $Al_2O_3$ and $Fe_2O_3$ into the reaction chamber for reaction with the remaining portion of alkali metal to form high-melting alkali metal crystalline compounds, said metal oxide being added to provide an amount corresponding to at least 1 mole thereof for every 2 moles of water-insoluble Na present in the bed when said oxide is $Al_2O_3$ or $Fe_2O_3$, and to provide at least 2 moles thereof for every 2 moles of water-insoluble Na present in the bed when said oxide is CaO or MgO and
   4. discharging the gaseous and solid reaction products from the reaction chamber for disposal or further treatment.

2. The process of claim 1 wherein the fluidized body is maintained at a temperature in the range from about 850°C up to about 950°C.

3. The process of claim 2 wherein the fluidized body is composed of sand.

4. The process of claim 3 wherein said finely divided $SiO_2$ has an average particle size of −325 mesh.

5. The process of claim 4 in which $Al_2O_3$ is added in an amount such that the weight ratio of $Al_2O_3/Na$ is at least 2.22 where Na is the water-insoluble sodium in the fluidized bed.

6. The process of claim 4 in which $Fe_2O_3$ is added in an amount such that the weight ratio of $Fe_2O_3/Na$ is at least 3.48 where Na is the water-insoluble sodium in the fluidized bed.

7. The process of claim 4 in which MgO is added in an amount such that the weight ratio of MgO/Na is at least 1.74 where Na is the water-insoluble sodium in the fluidized bed.

8. The process of claim 5 in which CaO is added in an amount such that the weight ratio if CaO/Na is at least 2.43 where Na is the water-insoluble sodium in the fluidized bed.

9. The process of claim 8 in which CaO is added in an amount such that the weight ratio of CaO/Na is at least 3.65 where Na is the water-insoluble sodium in the fluidized bed.

10. A process for fluid bed incineration, in the presence of sulfur or sulfur-containing compounds, of an aqueous combustible organic waste stream contaminated with at least one alkali metal chloride, comprising the steps of:
    1. fluidizing a body of particulate material in a reaction chamber by passing an upwardly flowing stream of air therethrough,
    2. maintaining the fluidized body at a temperature in the range from about 800°C up to about 1,000°C to burn the organic material,
    3. introducing finely divided $SiO_2$ and $Al_2O_3$ in the form of clay into the reaction chamber for combination with the alkali metal to form high-melting alkali metal crystalline compounds, the clay being added in an amount sufficient to provide at least 1 mole of $Al_2O_3$ for each 2 moles of alkali metal present in said combustible waste stream, whereby at least 2 moles of $SiO_2$ per mole of $Al_2O_3$ are provided, and
    4. discharging the gaseous and solid reaction products from the reaction chamber for disposal or further treatment.

11. The process of claim 10 wherein the fluidized body is maintained at a temperature in the range from about 850°C up to about 950°C.

12. The process of claim 11 wherein the fluidized body is composed of sand.

13. The process of claim 12 wherein said gaseous and solid reaction products include HCl and sulfate compounds.

* * * * *